(12) United States Patent
Kim et al.

(10) Patent No.: US 7,454,765 B2
(45) Date of Patent: Nov. 18, 2008

(54) OPTICAL DISC DRIVE

(75) Inventors: Chung-ung Kim, Yongin-si (KR); Pil-Je Cho, Yongin-si (KR); Kyu-hyeong Lee, Suwon-si (KR); Young-woo Huh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 443 days.

(21) Appl. No.: 10/871,039

(22) Filed: Jun. 21, 2004

(65) Prior Publication Data

US 2005/0010942 A1    Jan. 13, 2005

(30) Foreign Application Priority Data

Jul. 9, 2003   (KR) .................. 10-2003-0046328
Aug. 9, 2003   (KR) .................. 10-2003-0055212

(51) Int. Cl.
   *G11B 17/03*   (2006.01)
(52) U.S. Cl. ...................................... 720/604
(58) Field of Classification Search ............... 720/604, 720/605, 707, 710, 713; 360/99.08, 99.05, 360/99.12, 92, 98.08; 369/75.2, 270
   See application file for complete search history.

(56) References Cited

U.S. PATENT DOCUMENTS

| | | | | |
|---|---|---|---|---|
| 6,438,087 B2 * | 8/2002 | Omori | ........................ | 720/604 |
| 6,438,095 B1 * | 8/2002 | Haga et al. | .................. | 720/707 |
| 6,874,155 B2 * | 3/2005 | Sogawa et al. | ............. | 720/710 |
| 6,959,443 B2 * | 10/2005 | Ohgaki | ....................... | 720/603 |
| 6,983,474 B2 * | 1/2006 | Shishido | ..................... | 720/713 |
| 7,055,156 B2 * | 5/2006 | Chuang et al. | ............. | 720/604 |
| 2002/0009036 A1 * | 1/2002 | Omori | ........................ | 369/75.2 |
| 2003/0147337 A1 * | 8/2003 | Kim | ........................... | 369/270 |

FOREIGN PATENT DOCUMENTS

| | | |
|---|---|---|
| JP | 9-326147 | 12/1997 |
| JP | 2000-235758 | 8/2000 |
| JP | 2000235758 A * | 8/2000 |

* cited by examiner

*Primary Examiner*—Tianjie Chen
(74) *Attorney, Agent, or Firm*—Staas & Halsey LLP

(57) ABSTRACT

An optical disc drive including a clamping mechanism, which faces a turntable, supports a surface of a disc, and is rotated. The clamping mechanism includes a clamper, which has access to the disc by a magnetic force when a spindle motor has access to the disc so that the disc is not deviated from a mounting portion when clamping is not completely performed, and a return member, which allows the clamper to be spaced apart from the disc as the spindle motor is spaced apart from the disc.

16 Claims, 14 Drawing Sheets

OPTICAL DISC DRIVE

CROSS-REFERENCE TO RELATED APPLICATIONS

This application claims the benefit of Korean Patent Application Nos. 2003-46328, filed on Jul. 9, 2003, and 2003-55212, filed on Aug. 9, 2003, in the Korean Intellectual Property Office, the disclosures of which are incorporated herein by reference.

BACKGROUND OF THE INVENTION

1. Field of the Invention

The present invention relates to an optical disc drive, and more particularly, to an optical disc drive that can be installed horizontally and vertically.

2. Description of the Related Art

Typically, optical disc drives are devices which write or read information by radiating light on an optical medium (hereinafter, referred to as a disc), such as a compact disc (CD) or a digital versatile disc (DVD).

FIG. 1 is a plan view showing a conventional optical disc drive. FIG. 2 is a cross-sectional view taken along a line I-I' of FIG. 1.

Referring to FIGS. 1 and 2, a tray 20 is installed to slide on a frame 10. The frame 10 includes a spindle motor 31 which rotates a disc 50, and a deck portion 30 on which an optical pickup portion 32 that slides in a radial direction of the disc 50 and has access to the disc 50 is installed. The deck portion 30 ascends and descends with respect to a bottom surface of the tray 20. In addition, the frame 10 further includes a loading motor 13 which loads/unloads the tray 20. A cover 40 is disposed on a top surface of the frame 10, and a clamper 41 is disposed in the cover 40.

When the disc 50 is mounted on a first mounting surface 21 of the tray 20 and the loading motor 13 is rotated, the tray 20 is slid in a direction A of FIG. 1 and loaded in the optical disc drive. After the tray 20 is loaded, the deck portion 30 ascends. A bottom surface 51 of the disc 50 contacts a turntable 34 disposed on a shaft of the spindle motor 31, and the disc 50 ascends with the deck portion 30. If the clamper 41 contacts a top surface 52 of the disc 50, the disc 50 is supported by the turntable 34 and the clamper 41. In this case, as shown in FIG. 2, the disc 50 is spaced upwardly by a predetermined gap from the first mounting surface 21. In this state, as the spindle motor 31 is rotated, the disc 50 is rotated, and the optical pickup portion 32 slides in the radial direction of the disc 50, has access to the disc 50, and writes and/or reproduces information. An operation of unloading the disc 50 is performed in a reverse order to the above-described loading operation.

In general, as shown in FIG. 1, an optical disc drive is installed horizontally. However, in FIG. 3, the optical disc drive of FIGS. 1 and 2 is shown in the case of vertical installation. When the optical disc drive is installed vertically, a protrusion jaw 23 that extends from a top surface of the tray 20 above the first mounting surface 21 is formed, so as to prevent the disc 50 from deviating from the first mounting surface 21 when the disc 50 is loaded. The disc 50 contacts only the turntable 34 while in an ascending range (D1 of FIG. 2) until the top surface 52 of the disc 50 contacts the clamper 41 after the bottom surface 51 of the disc 50 contacts the turntable 34. Thus, when the optical disc drive is installed vertically, the disc 50 may be deviated from the turntable 34.

The disc 50 used in the optical disc drive has a diameter of 120 mm. However, recently, a disc 60 having a diameter of 80 mm has been widely used in the optical disc drive. As shown in FIG. 4, a second mounting surface 22 stepped from the first mounting surface 21 downwards, is formed in the tray 20 so as to mount the disc 60. If the disc 60 is loaded in a state where the optical disc drive is installed vertically, as described above, the disc 60 may be deviated from the second mounting surface 22 when the tray 20 is loaded. In addition, since the second mounting surface 22 is stepped from the first mounting surface 21 downwards, an ascending range D2, extending to a top surface 62 of the disc 60 contacts the clamper 41 after a bottom surface 61 of the disc 60 contacts the turntable 34, is larger than the ascending range D1 of FIG. 2 when the disc 50 having a diameter of 120 mm is mounted. Accordingly, a possibility that the disc 60 is deviated from the turntable 34 before the disc 60 contacts the clamper 41 is very high.

SUMMARY OF THE INVENTION

Accordingly, it is an aspect of the present invention to provide an optical disc drive having an improved structure in which a disc is stably loaded when the disc is installed vertically.

It is another aspect of the present invention to provide an optical disc drive having an improved structure in which two types of discs having different diameters are stably loaded when the disc is installed vertically.

Additional aspects and/or advantages of the invention will be set forth in part in the description which follows and, in part, will be obvious from the description, or may be learned by practice of the invention.

The foregoing and/or other aspects of the present invention are achieved by providing an optical disc drive, the optical disc drive including a tray including a mounting portion on which a disc is mounted; a spindle motor including a turntable that supports a first surface of the disc and which is installed to have access to or be spaced apart from the disc; and a clamping mechanism, which faces the turntable, to support a second surface of the disc, and is rotated, wherein the clamping mechanism includes: a clamper, which has access to the disc by a magnetic force when the spindle motor has access to the disc so that the disc is not deviated from the mounting portion when clamping is not completely performed, and a return member, which spaces the clamper apart from the disc as the spindle motor is spaced apart from the disc.

The return member may be an elastic member, which elastically biases the camper in a direction in which the clamper is spaced apart from the disc, and the elastic member may be formed with the clamper as a single body.

The clamping mechanism may further include a support member that supports the clamper to move, and the return member may be an elastic member, which elastically biases the clamper with respect to the support member in a direction in which the clamper is spaced apart from the disc.

The return member may be a magnet, which is opposite to the turntable and spaces the clamper apart from the disc by a magnetic force.

The foregoing and/or other aspects of the present invention may also be achieved by providing an optical disc drive, the optical disc drive including first and second frames, which face each other; a tray, which slides on the first frame and on which a disc is mounted; a spindle motor including a turntable that supports a first surface of the disc and which is installed in the first frame to have access to or be spaced apart from the disc; and a clamping mechanism, which is installed in the second frame to be rotated, faces the turntable, supports a second surface of the disc, and is rotated, wherein the clamping mechanism includes: a clamper, which has access to the disc by a magnetic force when the spindle motor has access to the disc so that the disc is not deviated from the tray when clamping is not completely performed, and a return member, which spaces the clamper apart from the disc as the spindle motor is spaced apart from the disc.

The return member may be an elastic member including a first end supported by the second frame to be rotated, and a second end connected to the clamper and which elastically biases the clamper with respect to the second frame in a direction in which the clamper is spaced apart from the disc, and the elastic member may be formed with the clamper as a single body.

The clamping mechanism may include a support member, which is installed in the second frame to be rotated and supports the clamper to move, and the return member may be an elastic member, which elastically biases the clamper with respect to the support member in a direction in which the clamper is spaced apart from the disc.

The return member may be a magnet, which is installed in the second frame and allows the clamper to be spaced apart from the disc by a magnetic force.

The disc includes a first disc having a first diameter and a second disc having a second diameter smaller than the first diameter and the mounting portion includes a first mounting portion on which the first disc is mounted, and a second mounting portion, which is stepped from the first mounting portion so that the second disc is mounted on the second mounting portion. The tray may include a first deviation-preventing portion, which extends from a top surface of the tray in an upward direction of the first mounting portion and prevents the first disc from being deviated from the first mounting portion; and a second deviation-preventing portion, which extends from the first mounting portion in an upward direction of the second mounting portion and prevents the second disc from being deviated from the second mounting portion.

The first disc and the second disc may have diameters of 120 mm and 80 mm, respectively.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
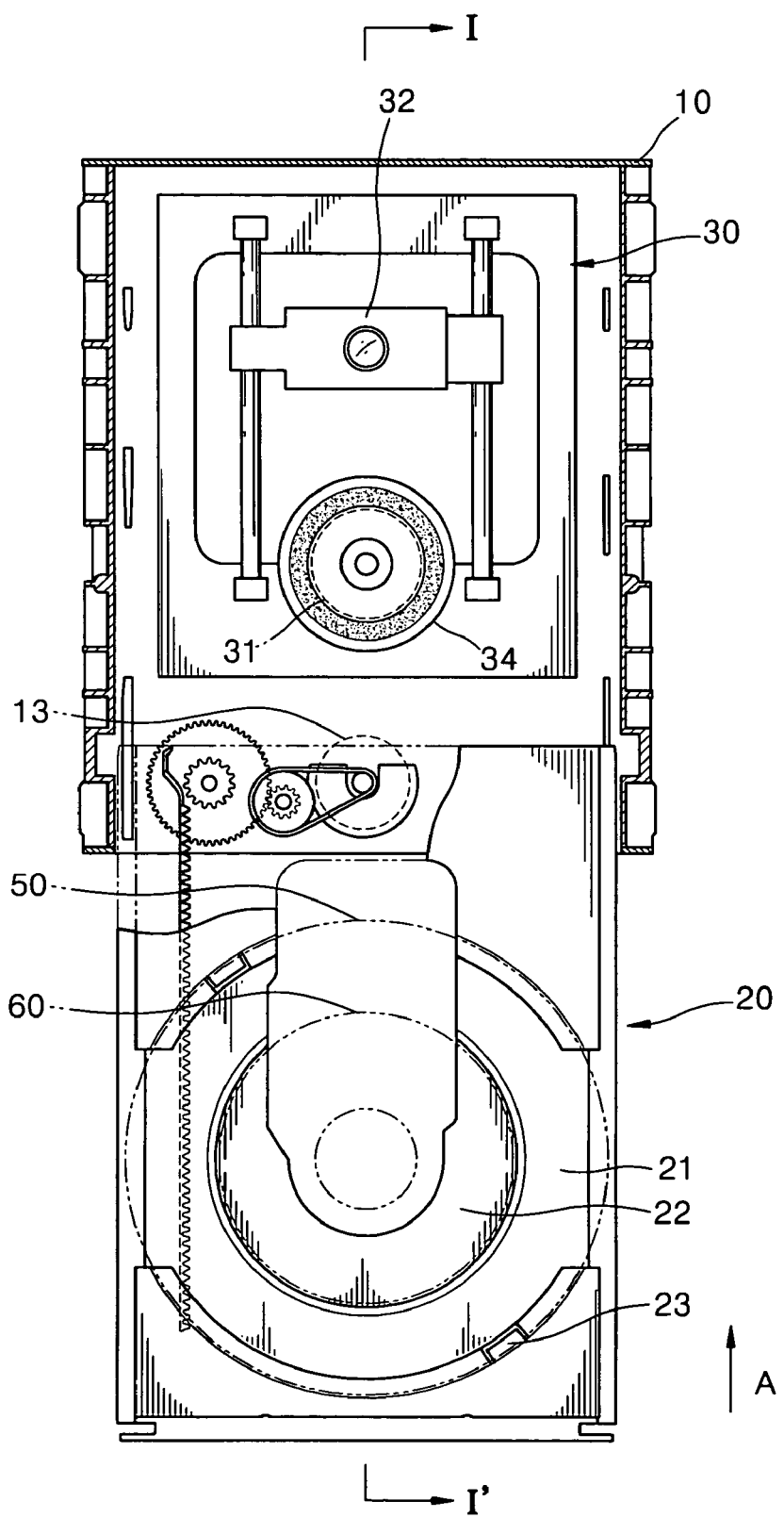
FIG. 1 is a plan view showing a conventional optical disc drive.
Figure 2:
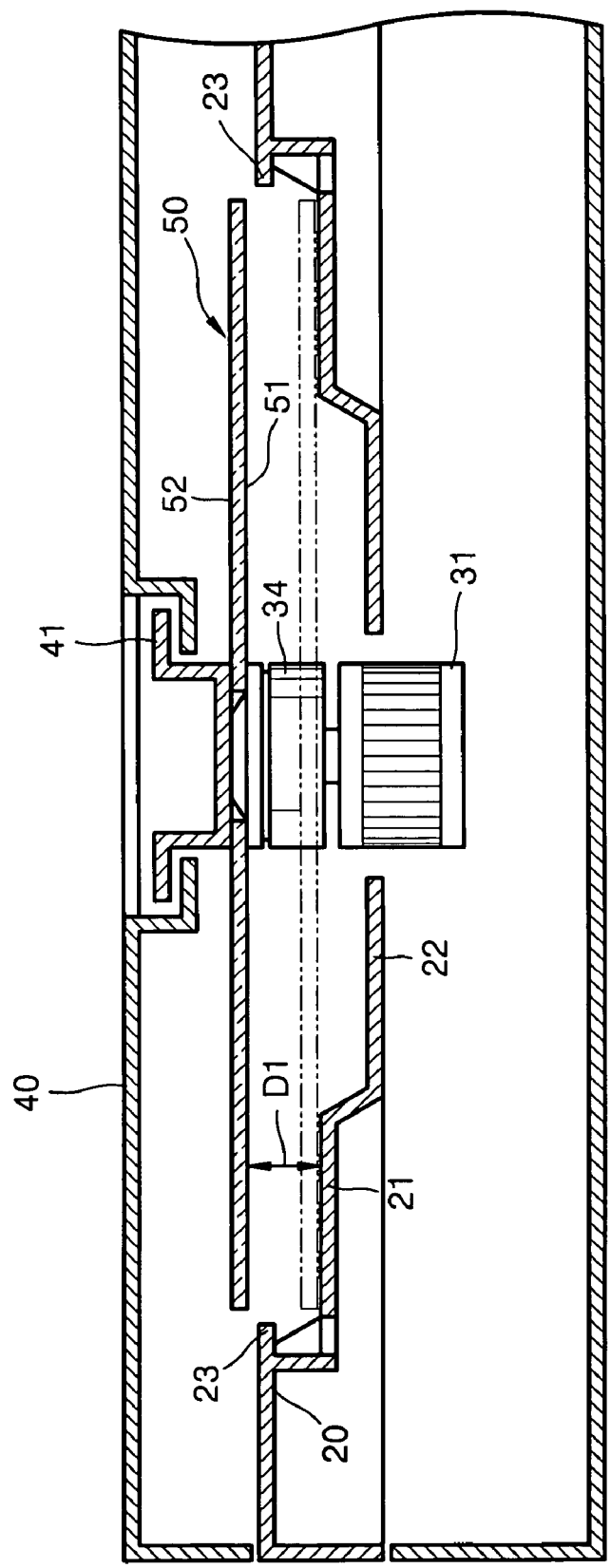
FIG. 2 is a cross-sectional view taken along line I-I' of FIG. 1.
Figure 3:
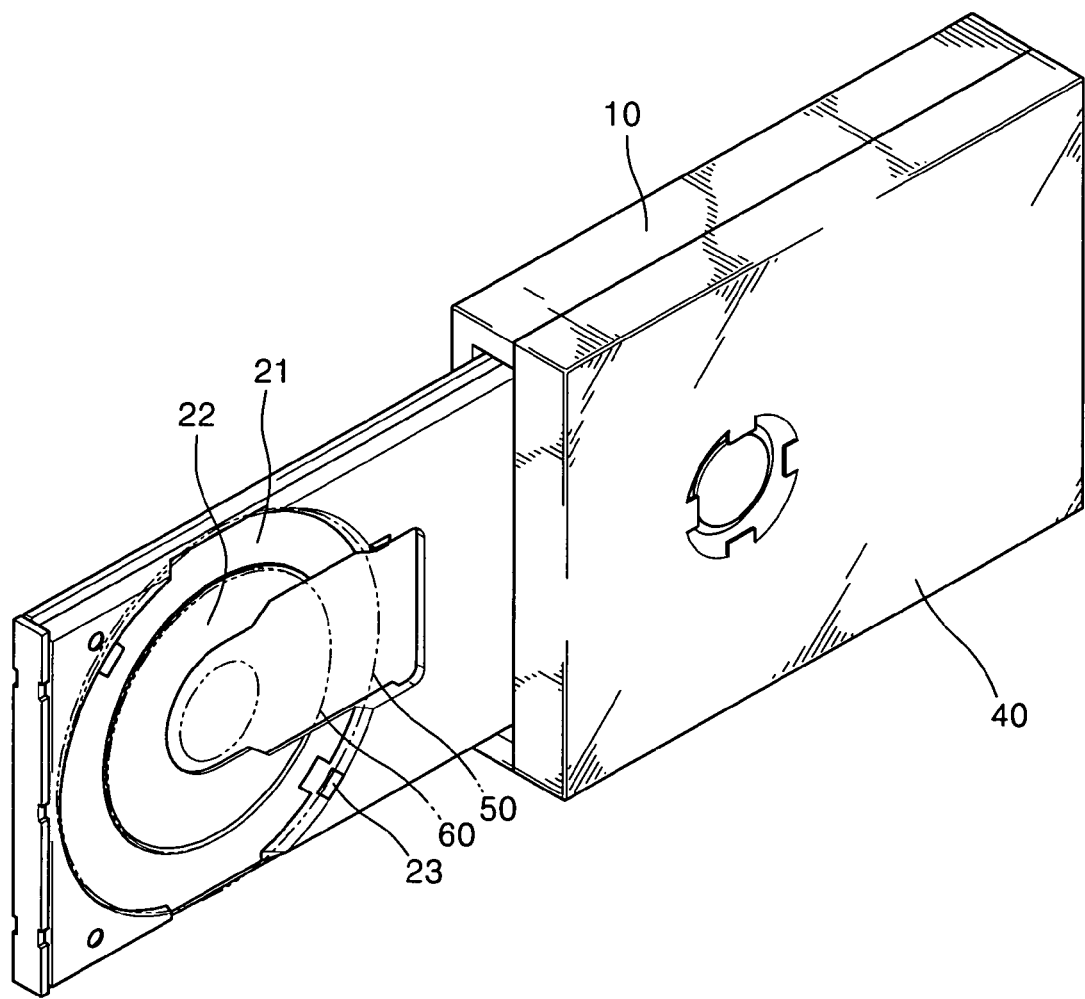
FIG. 3 is a perspective view of the optical disc drive of FIGS. 1 and 2 installed vertically.
Figure 4:
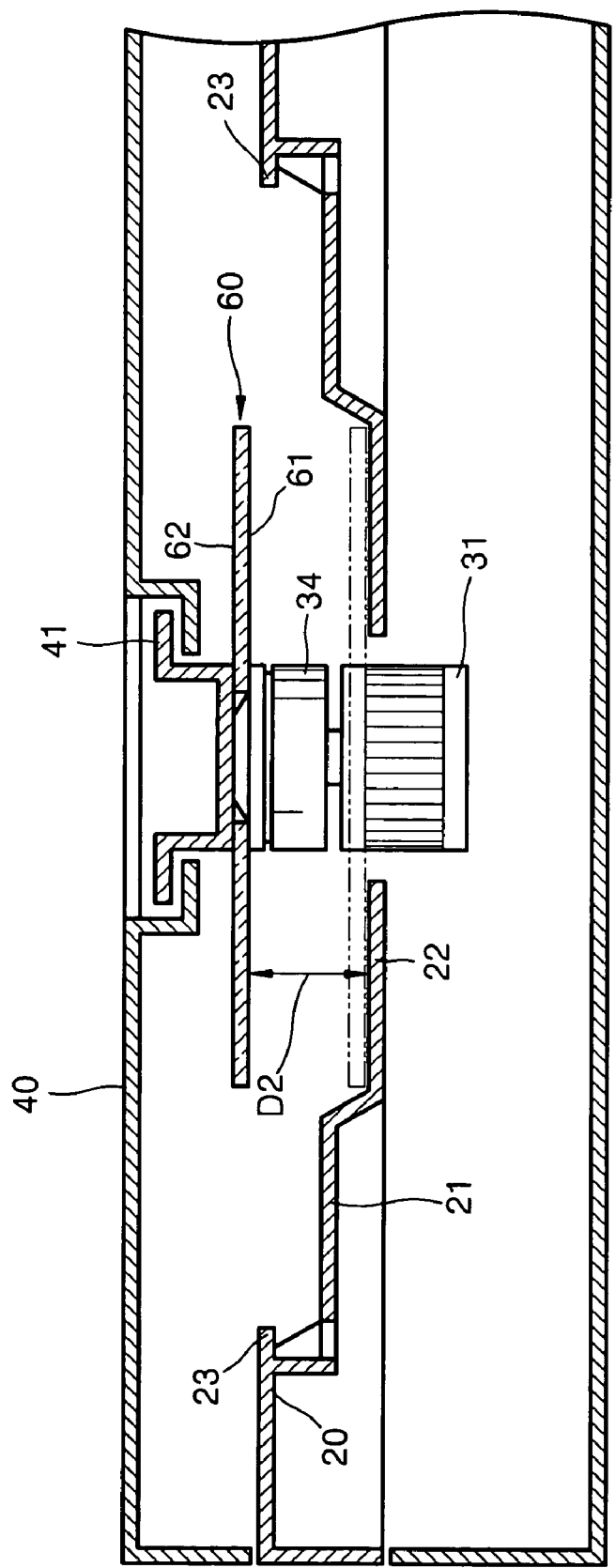
FIG. 4 is a cross-sectional view showing a case where a disc having a diameter of 80 mm is loaded in the optical disc drive of FIG. 3.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 5:
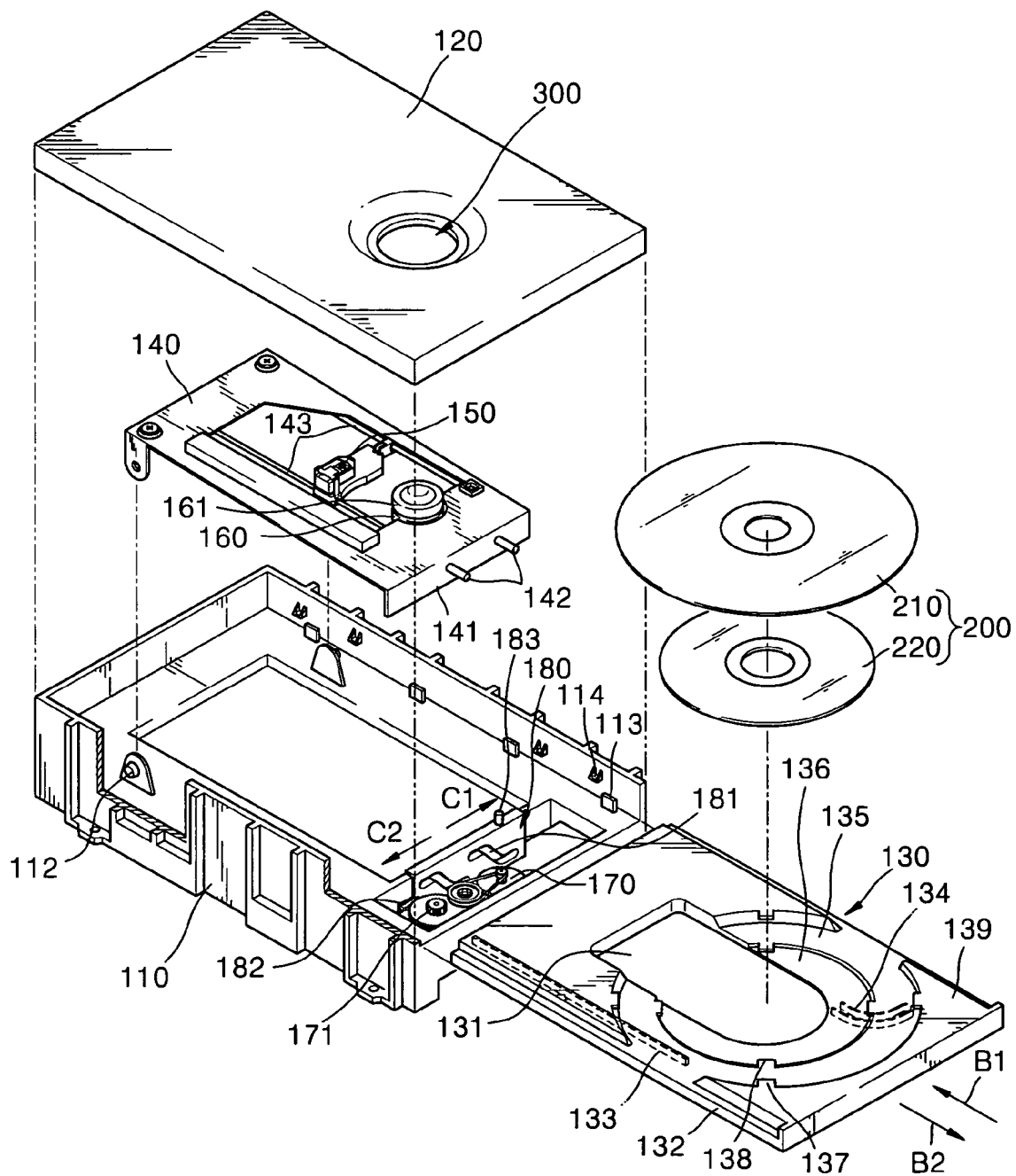
FIG. 5 is an exploded perspective view showing an optical disc drive according to an embodiment of the present invention.

FIG. 5 is an exploded perspective view showing an optical disc drive according to an embodiment of the present invention. A first frame 110, a second frame 120 facing the first frame 110, and a tray 130 are shown. A spindle motor 160 rotates a disc 200, and an optical pickup 150 has access to the disc 200 and writes and/or reproduces information on the disc 200. A loading motor 170 loads/unloads the tray 130. A pinion 171 is rotated by the loading motor 170. Reference numeral 300 is a clamping mechanism.

The loading motor 170 and the pinion 171 are installed in the first frame 110. In addition, a cam member 180 can slide on the first frame 110 in directions of C1 and C2. The cam member 180 includes a pair of first cam paths 181 and a first rack gear 182 selectively connected to the pinion 171. In addition, a boss 183 protrudes from the cam member 180.

A deck 140 is installed in the first frame 110. The spindle motor 160 and the optical pickup 150 are installed in the deck 140. A turntable 161 on which a bottom surface of the disc 200 is mounted is combined with the spindle motor 160. A magnet (not shown) is installed in the turntable 161. Alternatively, the turntable 161 may be formed of a magnetic substance, or at least part of the turntable 161 is magnetic. The optical pickup 150 can slide along a guide shaft 143. The deck 140 is combined with the first frame 110 to be rotated about a shaft 112 disposed in the first frame 110. Two shafts 142 are installed on a front surface 141 of the deck 140. The two shafts 142 are respectively inserted into the first cam paths 181.

The tray 130 can slide on the first frame 110. A plurality of guide members 113 and 114 spaced apart from each other upwards and downwards, are disposed at both sides of the first frame 110 to guide the tray 130. A window 131 is formed through the tray 130 so that the optical pickup 150 has access to the disc 200. A rail 132 to be interposed between the guide members 113 and 114 is formed at both sides of the tray 130. As indicated by a dotted line in FIG. 5, a second rack gear 133 connected to the pinion 171, and a second cam locus 134 that interferes with the boss 183 of the cam member 180 as the tray 130 is loaded, are disposed on a bottom surface of the tray 130.

A mounting portion on which the disc 200 is mounted is disposed in the tray 130. A first mounting portion 135 on which a first disc 210 is mounted and a second mounting portion 136 on which a second disc 220 is mounted are disposed in the tray 130. In the present embodiment, a disc having a diameter of 120 mm is referred to as the first disc 210, and a disc having a diameter of 80 mm is referred to as the second disc 220. The second mounting portion 136 is stepped from the first mounting portion 135 downwards. First and second deviation-preventing portions 137 and 138 are disposed in the tray 130 so that the first disc 210 or the second disc 220 is not deviated from the first mounting portion 135 or the second mounting portion 136 when the optical disc drive is installed vertically and the tray 130 is loaded. The first deviation-preventing portion 137 extends from a top surface 139 of the tray 130 in an upward direction of the first mounting portion 135. The second deviation-preventing portion 138 extends from the first mounting portion 135 in an upward direction of the second mounting portion 136. As shown in FIG. 5, at least four first and second deviation-preventing portions 137 and 138 are disposed symmetrically in a sliding direction of the tray 130.

Figure 6:
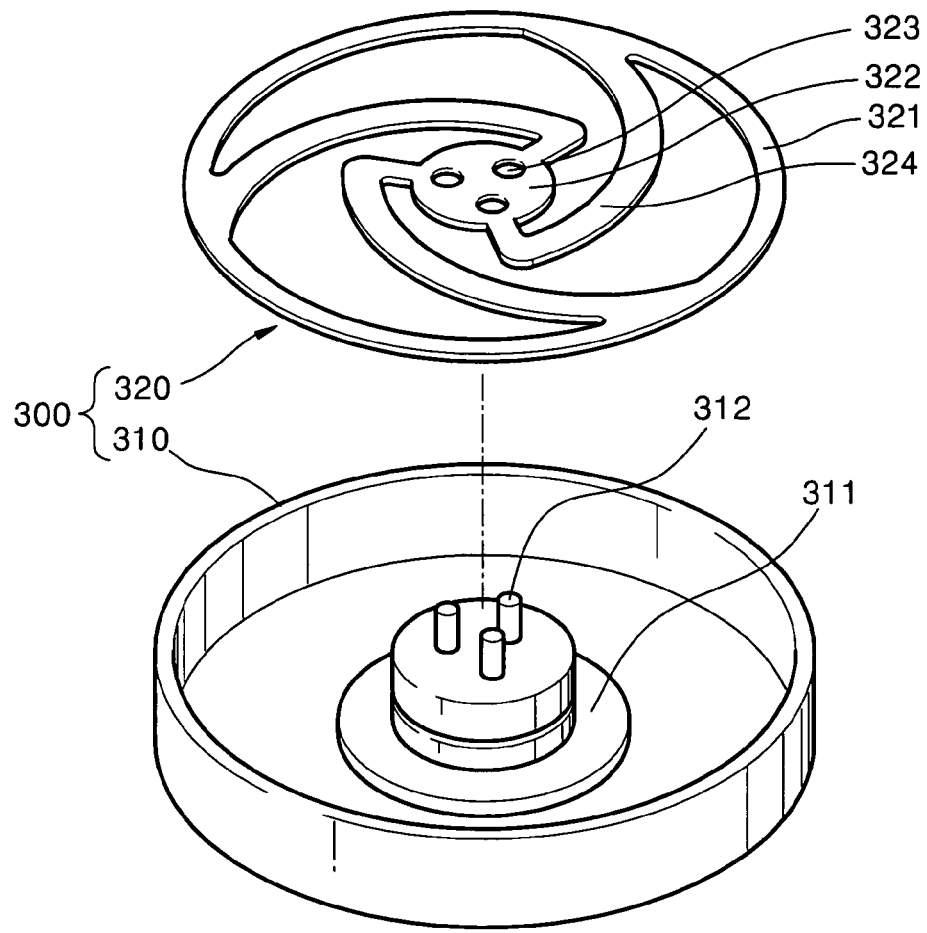
FIG. 6 is an exploded perspective view showing a first example of a clamping mechanism of FIG. 5.
Figure 7:
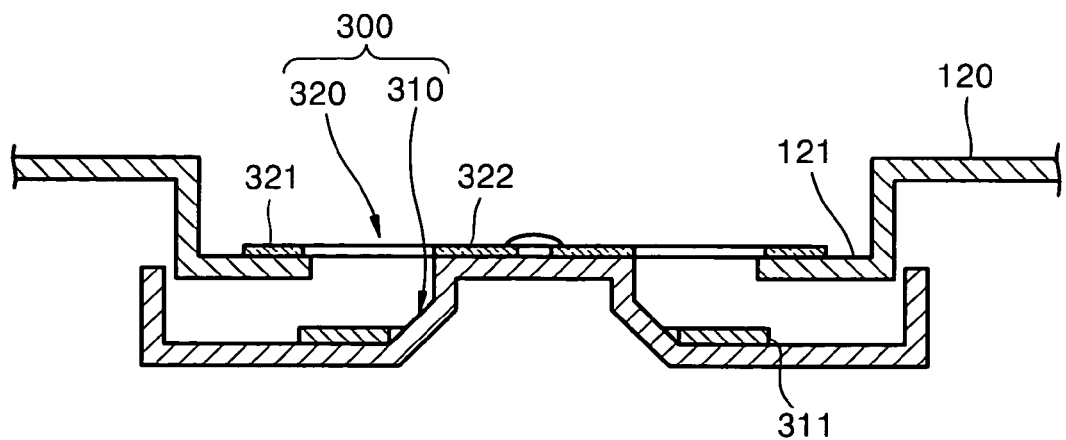
FIG. 7 is a cross-sectional view showing a case where the clamping mechanism is installed in a second frame.

The clamping mechanism 300 is installed in the second frame 120 to face the turntable 161 and to support the top surface of the disc 200 and to be rotated. FIG. 6 is a perspective view showing an example of the clamping mechanism 300 of FIG. 5. FIG. 7 is a cross-sectional view showing a case where the clamping mechanism 300 of FIG. 6 is installed in the second frame 120.

A clamper 310 and an elastic member 320 are shown in FIG. 6. The clamping mechanism 300 is characterized in that the elastic member 320 is used as a return member for allowing the clamper 310 to be spaced apart from the disc 200. The clamper 310 faces the turntable 161 and supports the top surface of the disc 200. An iron piece 311 is disposed in the clamper 310 to be induced by a magnetic force of a magnet (not shown) installed in the turntable 161. The elastic member 320 includes an outer circumference 321 and an inner circumference 322. The outer circumference 321 and the inner circumference 322 are connected to three spiral arms 324. The number of spiral arms 324 is not limited to three, but more spiral arms 324 may be formed. The inner circumference 322 is combined with the clamper 310. The elastic member 320 has a leaf spring shape, and the clamper 310 is formed of plastic. Three holes 323 are formed in the inner circumference 322 of the elastic member 320, and three bosses 312 are disposed in the clamper 310. The bosses 312 are respectively inserted into the three holes 323, heat is applied to upper sides of the bosses 312 that protrude from the inner circumference 322 upwards, and the bosses 312 are fused so that the clamper 310 and the elastic member 320 are combined with each other. The elastic member 320 is not limited to the leaf spring of FIG. 6.

Referring to FIG. 7, the outer circumference 321 of the elastic member 320 is supported by the second frame 120. The elastic member 320 is not fixedly supported by the second frame 120 to move vertically and horizontally. Reference numeral 121 denotes a support on which the outer circumference 321 is formed. The clamper 310 is disposed on a bottom surface of the second frame 120.

An operation of installing the optical disc drive having the above structure vertically and loading the first disc 210 and the second disc 220 will now be described.

First, an operation of loading the first disc 210 will be described. As shown in FIG. 5, the first disc 210 is mounted on the first mounting portion 135. If the loading motor 170 is rotated, the pinion 171 connected to the second rack gear 133 is rotated. The tray 130 is slid in a direction of arrow B1 of FIG. 5. In this case, the first rack gear 182 is spaced apart from the pinion 171, and the cam member 180 does not move. The first disc 210 is caught on the first deviation-preventing portion 137 and is not deviated from the first mounting portion 135.

The tray 130 is continuously slid on the first frame 110, and the boss 183 of the cam member 180 is inserted into the second cam locus 134 disposed in the tray 130. As the tray 130 slides, the cam member 180 moves in the C1 direction of FIG. 5 by an interference between the second cam locus 134 and the boss 183, and the first rack gear 182 is connected to the pinion 171. When the tray 130 is completely loaded, connection of the pinion 171 and the second rack gear 133 is terminated, and the tray 130 stops sliding. As the loading motor 170 is continuously rotated, the cam member 180 slides in the C1 direction of FIG. 5, and the deck 140 is rotated around on the shaft 112 by an interference between the shaft 142 and the first cam paths 181. Thus, the spindle motor 160 ascends toward the first disc 210.

Figure 8:
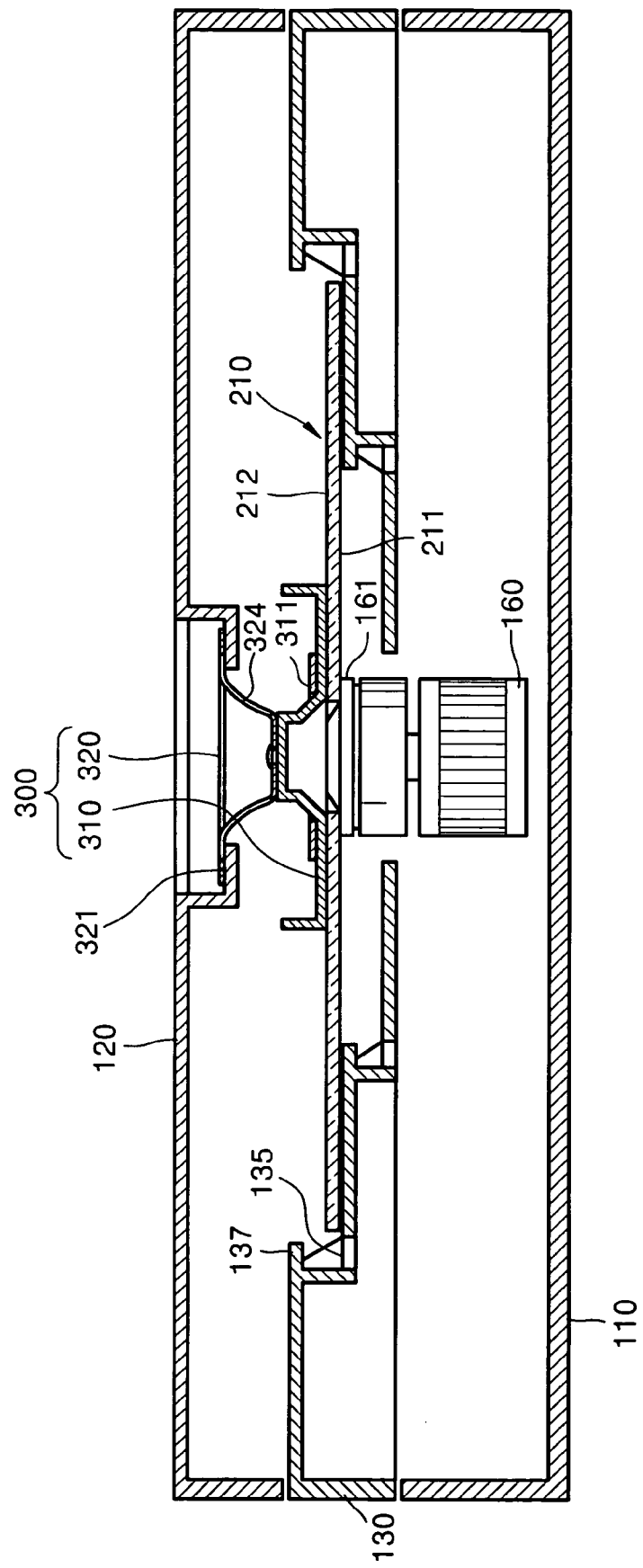
FIGS. 8 and 9 are cross-sectional views of the optical disc drive of FIG. 5 to show an operation of loading a first disc.
Figure 9:
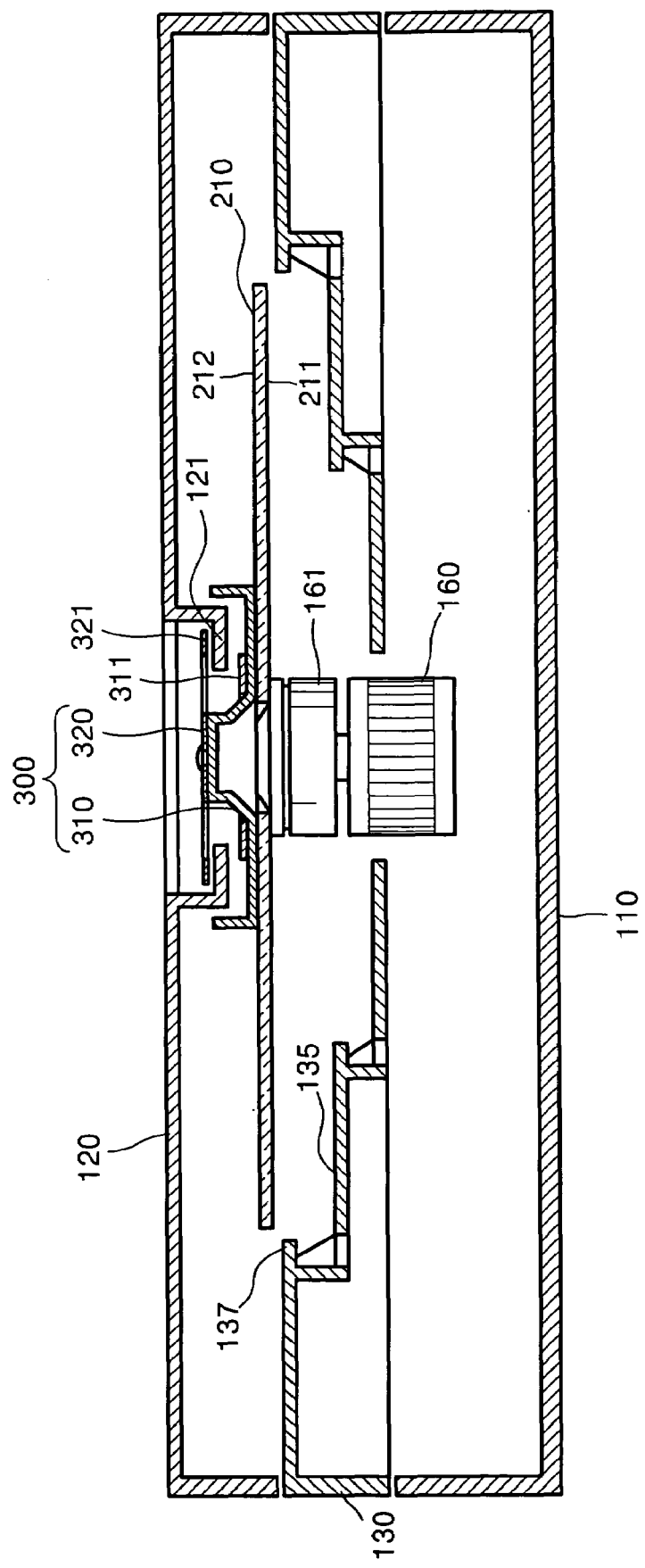

As shown in FIG. 8, when the turntable 161 contacts a bottom surface 211 of the first disc 210, the first disc 210 starts to be spaced apart from the first mounting portion 135 as the spindle motor 160 ascends. In the conventional optical disc drive of FIG. 1, in this case, the disc 50 of the present embodiment is deviated from the turntable 34 and loading errors may occur. However, the optical disc drive includes the clamping mechanism 300 to prevent this problem. As shown in FIG. 8, as the turntable 161 has access to the first disc 210, the iron piece 311 disposed in the clamper 310 is induced by a magnetic force of a magnet (not shown) installed on the turntable 161. Then, the spiral arms 324 are deformed, and simultaneously, the clamper 310 has access to the first disc 210. The clamper 310 contacts a top surface 212 of the first disc 210. As the spindle motor 160 ascends continuously, the clamper 310 is pushed and ascends upwards. When ascending of the spindle motor 160 is terminated, as shown in FIG. 9, the outer circumference 321 of the elastic member 320 is slightly spaced apart from the support 121 of the second frame 120. The turntable 161 supports the bottom surface 211 of the first disc 210, and the clamper 310 supports the top surface 212 of the first disc 210 by a magnetic force of a magnet (not shown). If the spindle motor 160 is rotated, the clamping mechanism 300 supports the first disc 210 and is rotated.

An operation of unloading the first disc 210 is performed in a reverse order to the above-described loading operation. If the loading motor 170 is rotated in reverse, the cam member 180 moves in the C2 direction of FIG. 5. Then, the deck 140 descends by an interference between the first cam paths 181 and the shaft 142. Then, as the spindle motor 160 descends, the clamping mechanism 300 also descends. If the outer circumference 321 of the elastic member 320 contacts the support 121, the spiral arms 324 are deformed, and only the clamper 310 descends.

When the spindle motor 160 descends continuously and an elastic force of the elastic member 320 is larger than a magnetic force of a magnet (not shown), the clamper 310 is deviated from the top surface 212 of the first disc 210 and is returned to its original position by an elastic force of the spiral arms 324. When the deck 140 descends, the pinion 171 and the second rack gear 133 are spaced apart from each other, and the tray 130 does not move. As the cam member 180 moves in the C2 direction, the tray 130 is slightly pushed in a B2 direction (FIG. 5) by an interference between the boss 183 and the second cam locus 134, and the pinion 171 and the second rack gear 133 are connected to each other. In this case, connection of the pinion 171 and the second rack gear 133 is terminated, and descending of the deck 140 is complete. As the loading motor 170 is rotated, the tray 130 slides in the B2 direction of FIG. 5 and is unloaded.

Next, an operation of loading the second disc 220 will be described.

Figure 10:
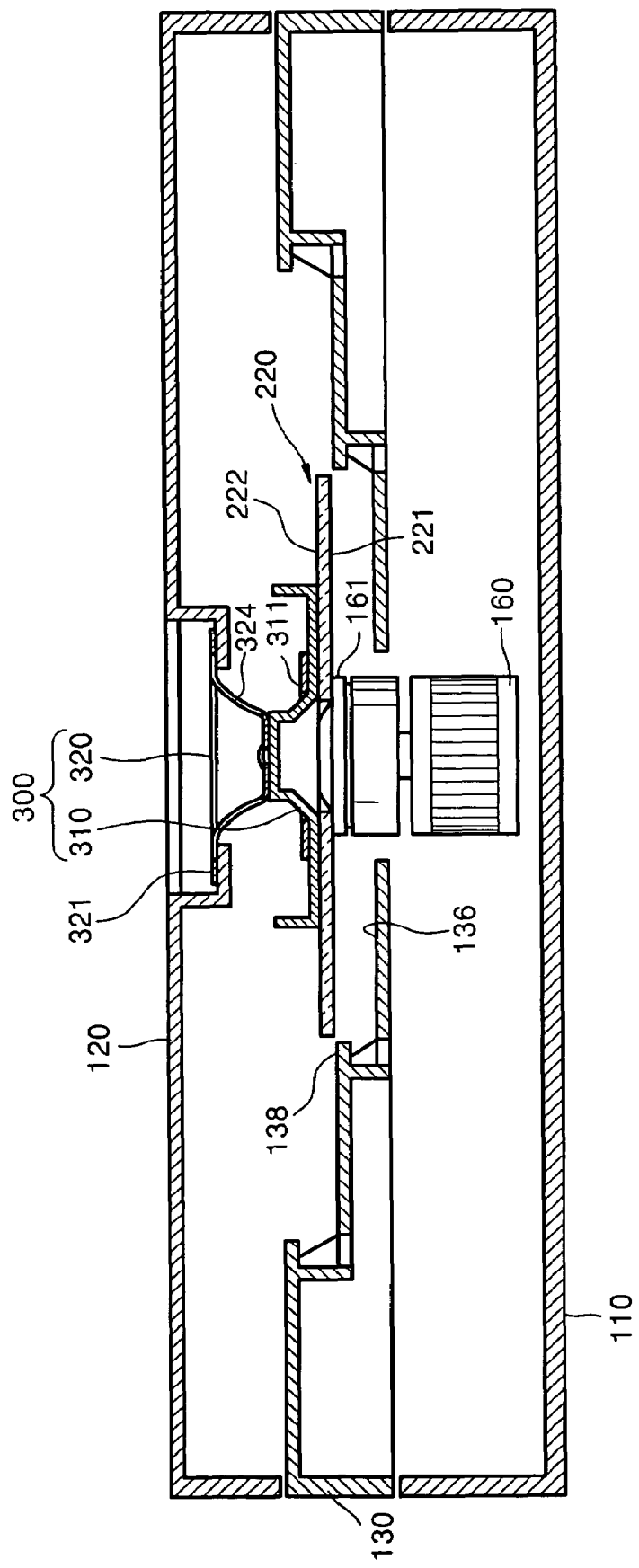
FIGS. 10 and 11 are cross-sectional views of the optical disc drive of FIG. 5 which illustrate an operation of loading a second disc.

An operation performed before the deck 140 ascends is the same operation as the above-described operation of loading the first disc 210. While the tray 130 is loaded, the second disc 220 is caught on the second deviation-preventing portion 138 and is not deviated from the second mounting portion 136. If the deck 140 starts ascending, the turntable 161 has access to the bottom surface 221 (FIG. 10) of the second disc 220. As a result, as shown in FIG. 10, the spiral arms 324 are deformed by a magnetic force of a magnet (not shown), and the clamper 310 has access to a top surface 222 of the second disc 220.

Figure 11:
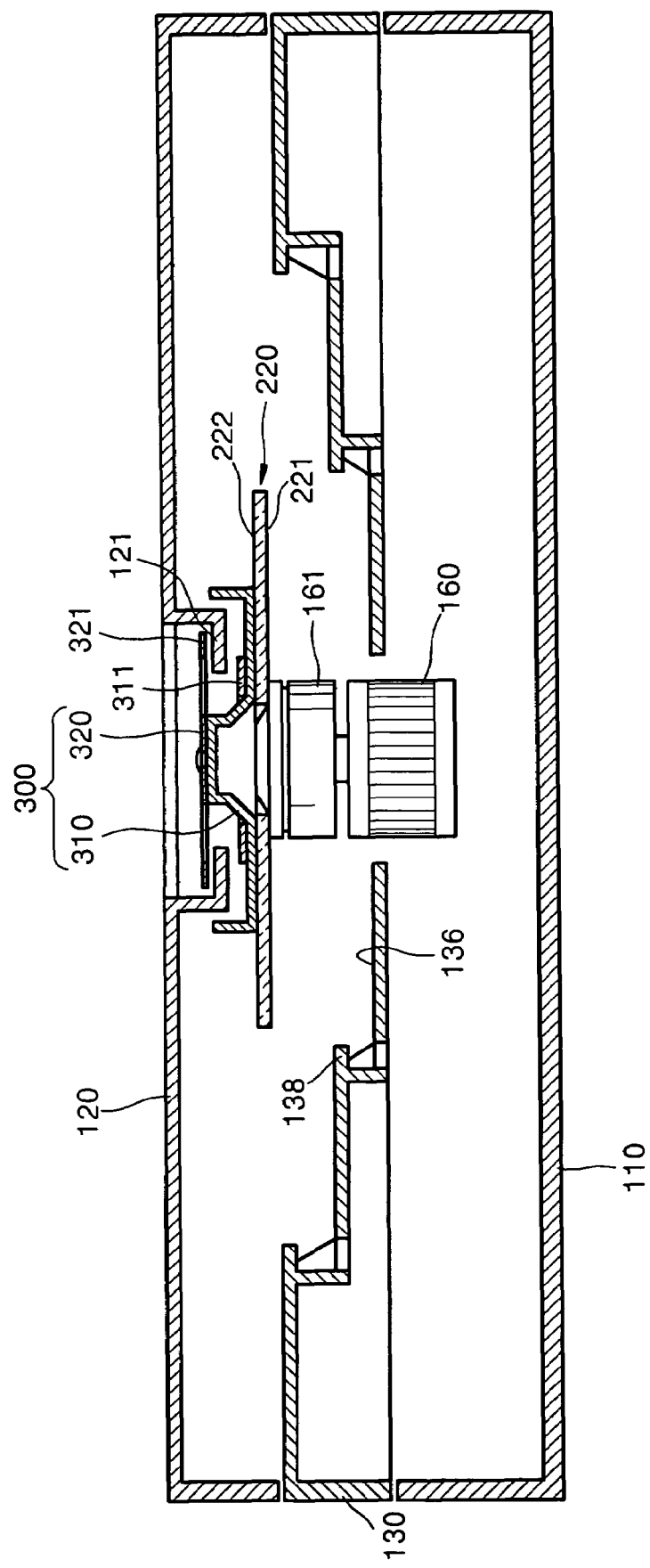

When the turntable 161 contacts the bottom surface 221 of the second disc 220, the clamper 310 descends to the same height as the height of the first mounting portion 135. Alternatively, when the turntable 161 contacts the bottom surface 221 of the second disc 220, the clamper 310 may contact the top surface of the second disc 220. By adjusting the magnetic force of the magnet (not shown) and the elasticity of the elastic member 320, the descending position of the clamper 310 can be adjusted. A subsequent operation is the same as the above-described operation of loading the first disc 210. If ascending of the deck 140 is completed, as shown in FIG. 11, the outer circumference 321 of the elastic member 320 is slightly spaced apart from the support 121 of the second frame 120. The turntable 161 supports the bottom surface 221 of the second disc 220, and the clamper 310 supports the top surface 222 of the second disc 220 by the magnetic force of the magnet (not shown). If the spindle motor 160 is rotated, the clamping mechanism 300 supports the second disc 220 and is rotated. The operation of loading the second disc 220 is performed in a reverse order to the above-described loading operation.

Figure 12:
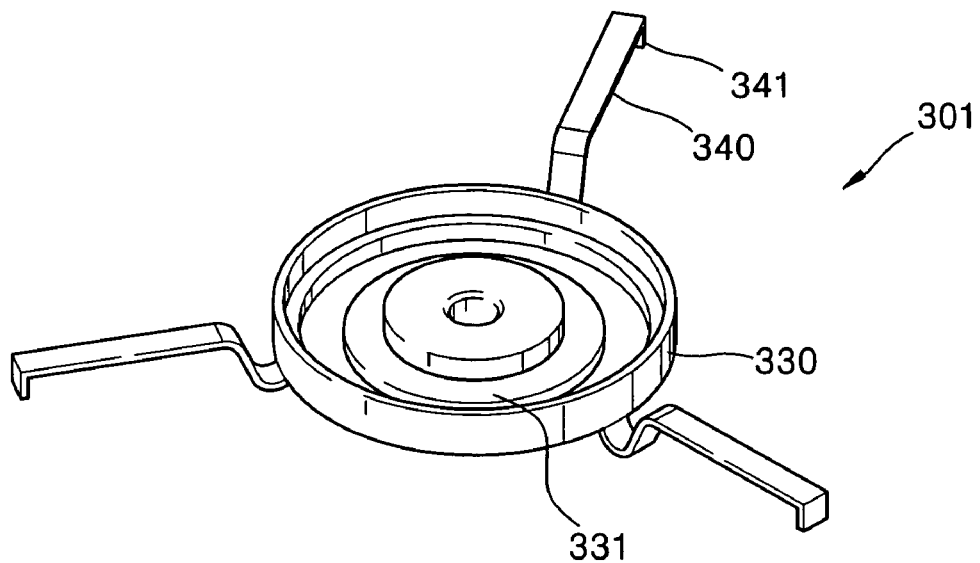
FIG. 12 is a perspective view showing another example of the clamping mechanism of FIG. 5.

FIG. 12 is a perspective view showing another example of the clamping mechanism. A clamping mechanism 301 is one modified example of the clamping mechanism 300 shown in FIG. 6 and includes a clamper 330 and the elastic member 320, which form a single body. Referring to FIG. 12, three elastic arms 340 extend in a radial direction of the clamper 330. An end 341 of each of the elastic arms 340 is supported by the support 121 of the second frame 120. An iron piece 331 is induced by a magnetic force of a magnet (not shown) installed in the turntable 161. As the spindle motor 160 ascends, the elastic arms 340 are deformed by a magnetic force generated between the magnet (not shown) and the iron piece 331, and simultaneously, the clamper 330 descends. If the spindle motor 160 descends, the clamper 330 ascends by an elastic force of the elastic arms 340.

Figure 13:
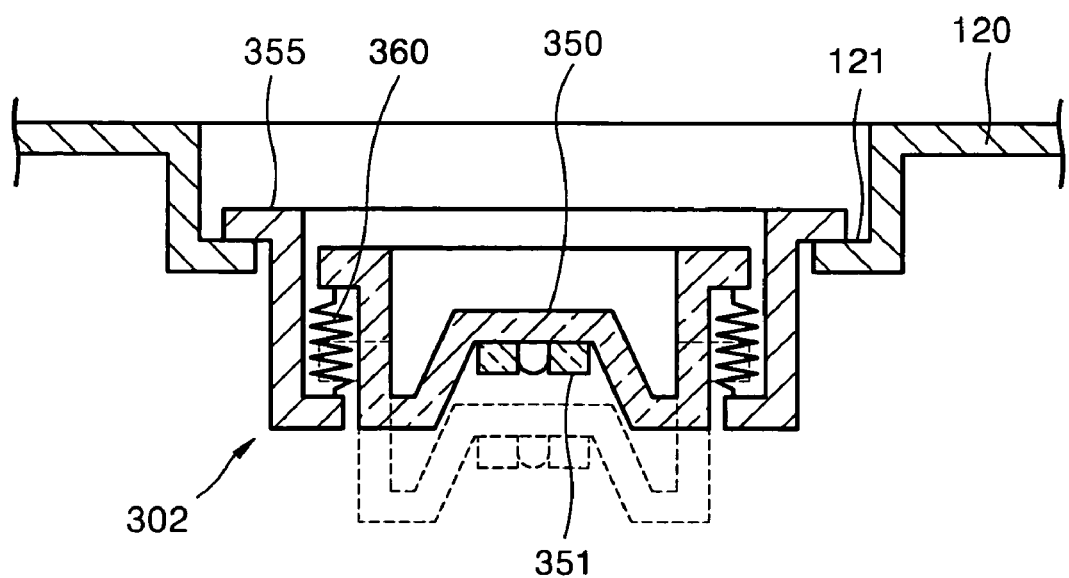
FIG. 13 is a cross-sectional view showing another example of the clamping mechanism of FIG. 5.

FIG. 13 is a cross-sectional view showing another example 302 of the clamping mechanism. Referring to FIG. 13, the support 121 is disposed in the second frame 120, and a support member 355 is installed in the support 121 to move upwards and downwards and right and left. A clamper 350 is disposed inside the support member 355. An iron piece 351 is disposed in the clamper 350 to be induced by a magnetic force of a magnet (not shown) installed in the turntable 161. An elastic member 360 elastically biases the clamper 350 with respect to the support member 355 in a direction where the clamper 350 is spaced apart from the disc 200. In the present embodiment, a compression coil spring is used as the elastic member 360.

The structure and operation of the optical disc drive having the above structure are similar to those described in FIGS. 8 through 11, and thus will be only briefly described. As the spindle motor 160 has access to the disc 200, the clamper 350 has access to the disc 200 by a magnetic force generated between a magnet (not shown) installed in the turntable 161 and the iron piece 351 so that the disc 200 is prevented from being deviated from the first mounting portion 135 or the second mounting portion 136. If the spindle motor 160 ascends continuously and clamping of the disc 200 is completed, the support member 355 ascends to be slightly spaced apart from the support 121. If the spindle motor 160 is rotated, a clamping mechanism 302 faces the turntable 161, supports the disc 200, and is rotated.

Figure 14:
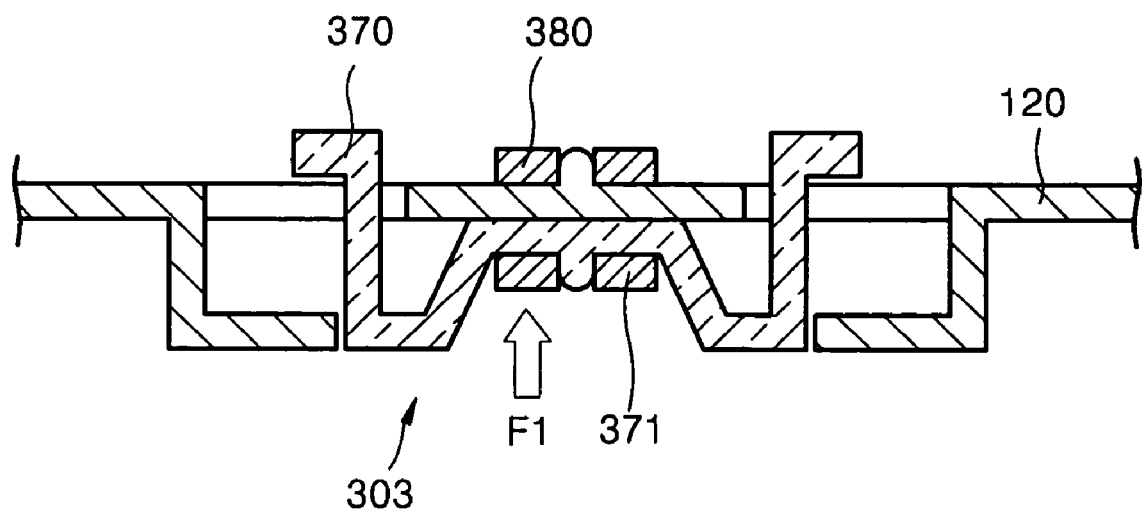
FIG. 14 is a cross-sectional view showing another example of the clamping mechanism.
Figure 15:
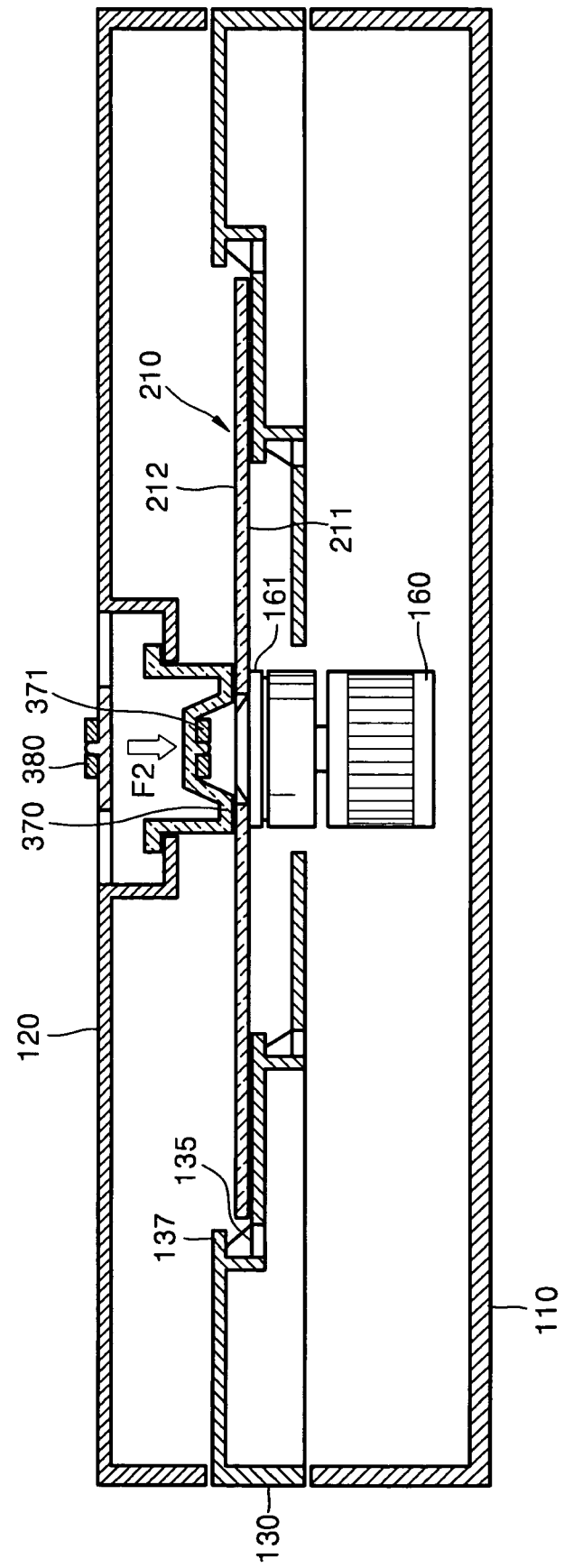
FIGS. 15 and 16 are cross-sectional views showing a function of the clamping mechanism of FIG. 14.
Figure 16:
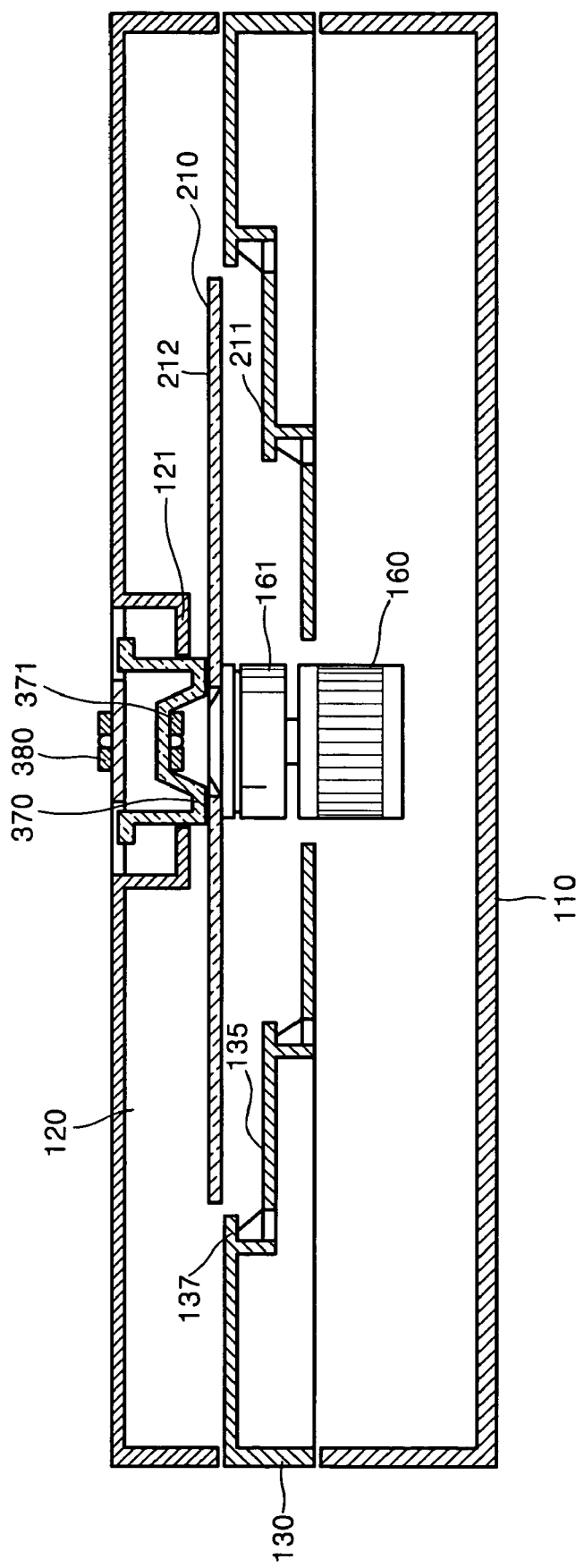

FIG. 14 is a cross-sectional view showing another example of a clamping mechanism 303. FIGS. 15 and 16 are cross-sectional views showing a function of the clamping mechanism 303 of FIG. 14.

Referring to FIG. 14, a clamper 370 is installed in the second frame 120 to move upwards and downwards and right and left. An iron piece 371 is disposed in the clamper 370 to be induced by a magnetic force of a magnet (not shown) installed in the turntable 161. A magnet 380 is installed in the second frame 120. The clamping mechanism 303 according to the present embodiment is characterized in that when the spindle motor 160 is spaced apart from the disc 200, the magnet 380 is used as a return member to allow the clamper 310 to be spaced apart from the disc 200. The magnet 380 has magnetism weaker than the magnet (not shown) installed in the turntable 161.

An operation of loading/unloading the first disc 210 with respect to the embodiment of FIG. 14 will now be described.

While the tray 130 is loaded, as shown in FIG. 14, the clamper 370 is attached to the second frame 120 by a magnetic force F1 generated between the magnet 380 and the iron piece 371. As loading of the tray 130 is completed and the spindle motor 160 ascends, a magnetic force F2 of the magnet (not shown) installed in the turntable 161 affects the iron piece 371. If the magnetic force F2 is larger than the magnetic force F1 of the magnet 380, as shown in FIG. 15, the clamper 370 is deviated from the second frame 120 and contacts the top surface 212 of the first disc 210. If ascending of the spindle motor 160 is terminated and clamping of the first disc 210 is completed, as shown in FIG. 16, the clamper 370 ascends to be slightly spaced apart from the second frame 120. Since the magnetic force F2 is larger than the magnetic force F1, the clamper 370 supports the top surface 212 of the first disc 210 and is rotated as the spindle motor 160 is rotated.

An operation of unloading the first disc 210 is performed in a reverse order to the above-described loading operation. As the spindle motor 160 descends, the clamper 370 also descends. If the first disc 210 contacts the first mounting portion 135, the clamper 370 is maintained in a state in which the clamper 370 contacts the top surface 212 of the first disc 210, and only the spindle motor 160 descends. If the spindle motor 160 descends to a position in which the magnetic force F2 is smaller than the magnetic force F1, the clamper 370 moves to the second frame 120 by the magnetic force F1 and is in a state shown in FIG. 14. An operation of loading/unloading the second disc 220 is the same as the operation of loading/unloading the first disc 210, and thus, repeated descriptions thereof will be omitted.

The optical disc drive having one of the clamping mechanisms 300, 301, 302, and 303 according to the embodiments of the present invention is particularly effective when the second disc 220 is loaded in a state in which the optical disc drive is installed vertically. As described above, in the case of the conventional optical disc drive of FIG. 1, when the turntable 34 pushes the disc 60, the clamper 41 does not support the top surface 62 of the disc 60, and loading errors in which the disc 60 is deviated from the turntable 34 may occur. In the optical disc drive according to the embodiments of the present invention, while the turntable 161 contacts the bottom surface 221 of the second disc 220 and ascends, the clampers 310, 330, 350, and 370 support the top surface 222 of the second disc 220 so that the second disc 220 is not deviated from the turntable 161. Thus, even when the optical disc drive is installed vertically, the second disc 220 can be stably loaded.

In the above-described embodiment, the magnet is installed in the turntable 161, and the iron piece is disposed in one of the clampers 310, 330, 350, and 370. However, the scope of the present invention is not limited to this arrangement. Alternately, the magnet may be installed in one of the clampers 310, 330, 350, and 370, the iron piece may be disposed in the turntable 161, or the turntable 161 may be formed of a material that can be attached to the magnet.

In addition, magnets may be disposed in the turntable 161 and in one of the clampers 310, 330, 350, and 370. In the embodiment of FIG. 14, the magnetic force generated by the magnet 380 installed in the second frame 120 should be smaller than a magnetic force generated by the magnet installed in the turntable 161.

As described above, in the optical disc drive according to the embodiments of the present invention, a clamping mechanism supports one surface of a disc in a direction opposite to a turntable such that the disc can be stably loaded/unloaded. In addition, even when the optical disc drive is installed vertically, both a general disc having a diameter of 120 mm and a disc having a small diameter of 80 mm can be stably loaded/unloaded.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disc drive comprising:
a tray comprising a mounting portion on which a disc is mounted;
a spindle motor comprising a turntable that supports a first surface of the disc and which is installed to have access to or be spaced apart from the disc; and
a clamping mechanism, which faces the turntable, to support a second surface of the disc, and is rotated,
wherein the clamping mechanism comprises:
a clamper, which has access to the disc by a magnetic force when the spindle motor has access to the disc; and
a return member, providing a force less than the magnetic force to the clamper in a direction in which the clamper is separated from the turntable so that the clamper comes closer to the disc when the spindle motor is ascending with the disc, the clamper is separated from the disc when the spindle motor is descending, and thereby preventing the disc from deviating from the mounting portion of the tray when clamping and unclamping operation is performed,
wherein the return member is an elastic member, which elastically biases the clamper in a direction in which the clamper is spaced apart from the disc.

2. The optical disc drive of claim 1, wherein the elastic member is formed with the clamper as a single body.

3. The optical disc drive of claim 1, wherein the disc is selectively a first disc having a first diameter and a second disc having a second diameter smaller than the first diameter and the mounting portion includes a first mounting portion on which the first disc is mountable, and a second mounting portion, which is stepped from the first mounting portion so that the second disc is mountable on the second mounting portion.

4. The optical disc drive of claim 3, wherein the tray further comprises:
a first deviation-preventing portion, which extends from a top surface of the tray in an upward direction of the first mounting portion and prevents the first disc from being deviated from the first mounting portion; and
a second deviation-preventing portion, which extends from the first mounting portion in the upward direction and prevents the second disc from being deviated from the second mounting portion.

5. The optical disc drive of claim 3, wherein the first and second diameters are 120 mm and 80 mm, respectively.

6. An optical disc drive comprising:
a tray comprising a mounting portion on which a disc is mounted;
a spindle motor comprising a turntable that supports a first surface of the disc and which is installed to have access to or be spaced apart from the disc; and
a clamping mechanism, which faces the turntable, to support a second surface of the disc, and is rotated,
wherein the clamping mechanism comprises:
a clamper, which has access to the disc by a magnetic force when the spindle motor has access to the disc; and
a return member, providing a force less than the magnetic force to the clamper in a direction in which the clamper is separated from the turntable so that the clamper comes closer to the disc when the spindle motor is ascending with the disc, the clamper is separated from the disc when the spindle motor is descending, and thereby preventing the disc from deviating from the mounting portion of the tray when clamping and unclamping operation is performed,
wherein the clamping mechanism further comprises a support member that supports the clamper to move, and the return member is an elastic member, which elastically biases the clamper with respect to the support member in a direction in which the clamper is spaced apart from the disc.

7. An optical disc drive comprising:
first and second frames, which face each other;
a tray, which slides on the first frame and on which a disc is mounted;
a spindle motor comprising a turntable that supports a first surface of the disc and which is installed in the first frame to have access to or be spaced apart from the disc; and
a clamping mechanism, which is installed in the second frame to be rotated, faces the turntable, supports a second surface of the disc, and is rotated,
wherein the clamping mechanism comprises:
a clamper, which has access to the disc by a magnetic force when the spindle motor has access to the disc so that the disc is not deviated from the tray when clamping is not completely performed, and
a return member, providing a force less than the magnetic force to the clamper in a direction in which the clamper is separated from the turntable so that the clamper comes closer to the disc when the spindle motor is ascending with the disc, the clamper is separated from the disc when the spindle motor is descending, and thereby preventing the disc from deviating from the mounting portion of the tray when clamping and unclamping operation is performed,
wherein the clamping mechanism comprises a support member, which is installed in the second frame to be rotated and supports the clamper to move, and the return member is an elastic member, which elastically biases the clamper with respect to the support member in a direction in which the clamper is spaced apart from the disc.

8. The optical disc drive of claim 7, wherein the disc is selectively a first disc having a first diameter and a second disc having a second diameter smaller than the first diameter and the tray includes:
a first mounting portion on which the first disc is mountable, and a second mounting portion, which is stepped from the first mounting portion so that the second disc is mountable on the second mounting portion.

9. The optical disc drive of claim 8, wherein the tray further comprises:
a first deviation-preventing portion, which extends from a top surface of the tray in an upward direction of the first mounting portion and prevents the first disc from being deviated from the first mounting portion; and
a second deviation-preventing portion, which extends from the first mounting portion in the upward direction and prevents the second disc from being deviated from the second mounting portion.

10. The optical disc drive of claim 8, wherein the first and second diameters are 120 mm and 80 mm, respectively.

11. An optical disc drive comprising:
a mounting portion on which a disc is mounted;
a clamping mechanism to support the disc, comprising:
a clamper to press the disc against the mounting portion in a loaded state of the disc, and
a return member, a deformation of the return member varying according to the loaded or an unloaded state of the disc; and
a magnetically inductable element disposed in the clamper to be induced by a variable magnetic force to thereby move the clamper toward the disc in the loaded state.

12. The optical disc drive of claim 11, wherein the clamper comprises:
a magnetically inductable element to be selectively induced by a magnetic force to thereby move the clamper toward the disc in the loaded state; and
a boss to project into the return member.

13. The optical disc drive of claim 12, wherein the return member comprises:
an inner circumference comprising holes to receive the boss; and
an outer circumference comprising spiral arms to deform according to the magnetic force.

14. The optical disc drive of claim 11, further comprising:
a frame; and
a support movably installed between the frame and the return member;
wherein the return member is an elastic member.

15. The optical disc drive of claim 11, further comprising:
a magnetically inductable element disposed in the clamper to be selectively induced by a magnetic force;
a frame, the clamper being installed in the frame; and
a magnet on the frame, having a magnetic force less than the magnetic force of the magnetically inductable element in the loaded state.

16. The optical disc drive of claim 11, wherein the disc is installed vertically in the disc drive and the disc is not deviated from the mounting portion even when the clamper does not completely press the disc against the mounting portion.

* * * * *